United States Patent
Larrabee et al.

(10) Patent No.: US 10,307,784 B2
(45) Date of Patent: Jun. 4, 2019

(54) METHOD AND APPLICATOR FOR APPLYING SEALANT TO FASTENERS

(71) Applicant: The Boeing Company, Chicago, IL (US)

(72) Inventors: Diana Dujunco Dan Larrabee, Charleston, SC (US); Richard Lynn Hopkins, North Charleston, SC (US); Jonathan Christopher Heath, West Ashley, SC (US); John-Isaac Suttles, Charleston, SC (US); Robert J. Schumann, Mount Pleasant, SC (US)

(73) Assignee: The Boeing Company, Chicago, IL (US)

( * ) Notice: Subject to any disclaimer, the term of this patent is extended or adjusted under 35 U.S.C. 154(b) by 42 days.

(21) Appl. No.: 15/243,891

(22) Filed: Aug. 22, 2016

(65) Prior Publication Data
US 2018/0050364 A1 Feb. 22, 2018

(51) Int. Cl.
*B05C 1/02* (2006.01)
*B05C 5/00* (2006.01)
(Continued)

(52) U.S. Cl.
CPC ............ *B05C 5/0212* (2013.01); *B05C 1/027* (2013.01); *B05C 5/002* (2013.01); *B05C 17/00503* (2013.01); *B05C 17/00513* (2013.01); *B05C 17/00516* (2013.01); *F16B 39/021* (2013.01); *B05C 17/00593* (2013.01); *B05C 17/015* (2013.01)

(58) Field of Classification Search
None
See application file for complete search history.

(56) References Cited

U.S. PATENT DOCUMENTS 3,388,958 A * 6/1968 Johnson ............... B65D 83/285
222/146.3
4,201,491 A 5/1980 Kohler
(Continued)

FOREIGN PATENT DOCUMENTS

WO 2016066871 A1 5/2016

OTHER PUBLICATIONS

European Patent Office, Extended European Search Report regarding European Patent Application No. 17187131.2, dated Jan. 3, 2018, 8 pages.

*Primary Examiner* — Binu Thomas
(74) *Attorney, Agent, or Firm* — Kolisch Hartwell, P.C.

(57) ABSTRACT

A liquid sealant applicator system that may include a liquid sealant applicator having a coupling to reversibly connect to a source of liquid sealant, a sidewall extending from the coupling and defining a sealant flow path, a flow restrictor that restricts the sealant flow path to an annular pattern of apertures in the flow restrictor, a porous matrix that fills at least a portion of the sealant flow path downstream of the flow restrictor, a matrix retainer configured to retain the porous matrix within the sealant flow path, and a fastener socket connected to the sidewall and having a distal end configured to be placed over and at least substantially enclose the head of a preselected fastener. The applicator is configured to provide a uniform application of sealant from the source of the liquid sealant to the head of the fastener enclosed by the fastener socket.

13 Claims, 5 Drawing Sheets

(51) Int. Cl.
*B05C 5/02* (2006.01)
*B05C 17/005* (2006.01)
*F16B 39/02* (2006.01)
*B05C 17/015* (2006.01)

(56) References Cited

U.S. PATENT DOCUMENTS

| | | | |
|---|---|---|---|
| 4,474,195 A | 10/1984 | Warner | |
| 4,762,433 A | 8/1988 | Bergeson et al. | |
| 5,018,894 A | 5/1991 | Goncalves | |
| 5,196,117 A * | 3/1993 | Billiett | B01D 17/0202 210/260 |
| 5,597,255 A | 1/1997 | Yager et al. | |
| 5,823,206 A * | 10/1998 | Mapleback | A45D 34/04 401/140 |
| 6,457,893 B1 * | 10/2002 | Hamilton | A45D 34/04 222/192 |
| 6,547,471 B1 | 4/2003 | Tucker et al. | |
| 6,682,246 B2 * | 1/2004 | Reggiani | B65D 83/285 401/183 |
| 7,125,189 B2 | 10/2006 | Gueret | |
| 7,232,273 B2 | 6/2007 | Nealon et al. | |
| 7,390,533 B2 | 6/2008 | Krueger | |
| 7,416,358 B2 | 8/2008 | Legendre | |
| 8,585,309 B2 | 11/2013 | Song | |
| 9,061,313 B1 | 6/2015 | Williams et al. | |
| 9,180,480 B1 * | 11/2015 | Williams | B05C 1/06 |
| 2004/0074927 A1 * | 4/2004 | Lafond | B05C 17/00503 222/327 |
| 2014/0060973 A1 * | 3/2014 | Singer | B05C 1/04 184/15.1 |
| 2017/0036233 A1 * | 2/2017 | Maslennikov | B05C 1/06 |

* cited by examiner

METHOD AND APPLICATOR FOR APPLYING SEALANT TO FASTENERS

FIELD

This disclosure relates to sealant applicators, and methods of applying sealant compositions to fasteners. More specifically, the disclosure relates to applicators and methods for the application of liquid sealants to the selected fasteners.

INTRODUCTION

In many types of industrial manufacture, where a fastener is installed into an assembly a sealant may be applied to the fastener. In aerospace, for example, primers and sealants may be used as protection for the rivet-skin interface in riveted structures such as aircraft wings and aircraft fuselages. The application of sealant may help prevent corrosive materials in the atmosphere from being drawn into and degrading the rivet or skin material adjacent the rivet.

However, such fasteners may exhibit a wide variety of sizes and shapes, for example differing in width, height, and/or overall contour. It has therefore typically been required to apply the desired sealant manually to each fastener individually, using a brush or a syringe applicator. The application of sealant therefore becomes a time-consuming, tedious, and messy task.

Manual application also introduces the human factor into the process of applying sealant, requiring a steady hand and substantially increasing the costs associated with this aspect of the manufacturing process. The person applying the sealant needs to be careful and make sure that sealant is applied in accordance with the specifications, which do not allow bubbles, voids or inclusions. In addition, due to the specification requirements concerning the amount of sealant required around a fastener, the sealant needs to be of sufficient height, width, and thickness to prevent the entry of moisture, or for assemblies that are also integral fuel tanks to seal any potential leak paths. Furthermore, the application of sealant by hand may increase the generation of waste, and thereby increase the cost associated with waste disposal.

What is needed is an applicator that removes the operator-dependent factors from the sealant application process and allows for sealant to be applied quickly and consistently, and that can apply sealant around fasteners and structures having differing geometries in accordance with specification requirements. Such a method and applicator could reduce labor costs and add consistency to the application of sealant, while reducing the mess and waste associated with applying sealant through the use of prior systems.

SUMMARY

The present disclosure provides systems, apparatuses, and methods relating to liquid sealant application. In some embodiments, an applicator for applying a liquid sealant to a fastener may include a coupling that is configured to reversibly connect to a source of liquid sealant, a sidewall extending from the coupling and defining a sealant flow path, a flow restrictor disposed in the sealant flow path that restricts the sealant flow path to a plurality of apertures disposed in an annular pattern in the flow restrictor, a porous matrix that substantially fills at least a portion of the sealant flow path downstream of the flow restrictor, a matrix retainer configured to retain the porous matrix within the sealant flow path, and a fastener socket connected to the sidewall extending from the coupling, where the fastener socket has a distal end that is configured to be placed over a head of a preselected fastener and to at least substantially enclose the fastener head. The applicator is configured to provide a uniform application of sealant from the source of the liquid sealant to the head of the fastener enclosed by the fastener socket.

In some embodiments, a liquid sealant application system may include a pressurizable source of liquid sealant and a liquid sealant applicator, wherein the liquid sealant applicator includes a proximal coupling configured to reversibly connect to the pressurizable source of liquid sealant, a sidewall extending from the proximal coupling, a distal fastener socket connected to the sidewall and configured to be placed over the head of a preselected fastener, a sealant flow path from the proximal coupling to the distal fastener socket, a flow restrictor disposed in the sealant flow path having a plurality of apertures disposed in an annular pattern that is centered in the sealant flow path, a porous matrix that substantially fills at least a segment of the sealant flow path downstream of the flow restrictor, and a matrix retainer configured to retain the porous matrix within the sealant flow path. The liquid sealant application system is configured to provide a uniform application of the sealant from the source of the liquid sealant to the head of the fastener enclosed by the distal fastener socket.

In some embodiments, a method of applying a liquid sealant to a fastener may include connecting a pressurizable source of liquid sealant to a liquid sealant applicator, where the liquid sealant applicator includes a defined flow path for the sealant, a fastener socket at the end of the defined flow path configured to be placed over the fastener head, a flow restrictor disposed in the defined flow path, and a porous matrix occupying the defined flow path that contacts the flow restrictor and extends at least partially into the fastener socket. The method may further include positioning the fastener socket over the fastener head, and triggering a flow of sealant from the source of liquid sealant, where by passing through the flow restrictor and porous matrix the sealant is applied uniformly to the fastener head.

Features, functions, and advantages may be achieved independently in various embodiments of the present disclosure, or may be combined in yet other embodiments, further details of which can be seen with reference to the following description and drawings.

DESCRIPTION

The present disclosure is directed to a liquid sealant application system and method for applying liquid sealant to fasteners.

Various embodiments of a liquid sealant applicator and liquid sealant applicator system are described below and illustrated in the associated drawings. Unless otherwise specified, a liquid sealant applicator and/or its various components may, but are not required to, contain at least one of the structure, components, functionality, and/or variations described, illustrated, and/or incorporated herein. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Figure 1:
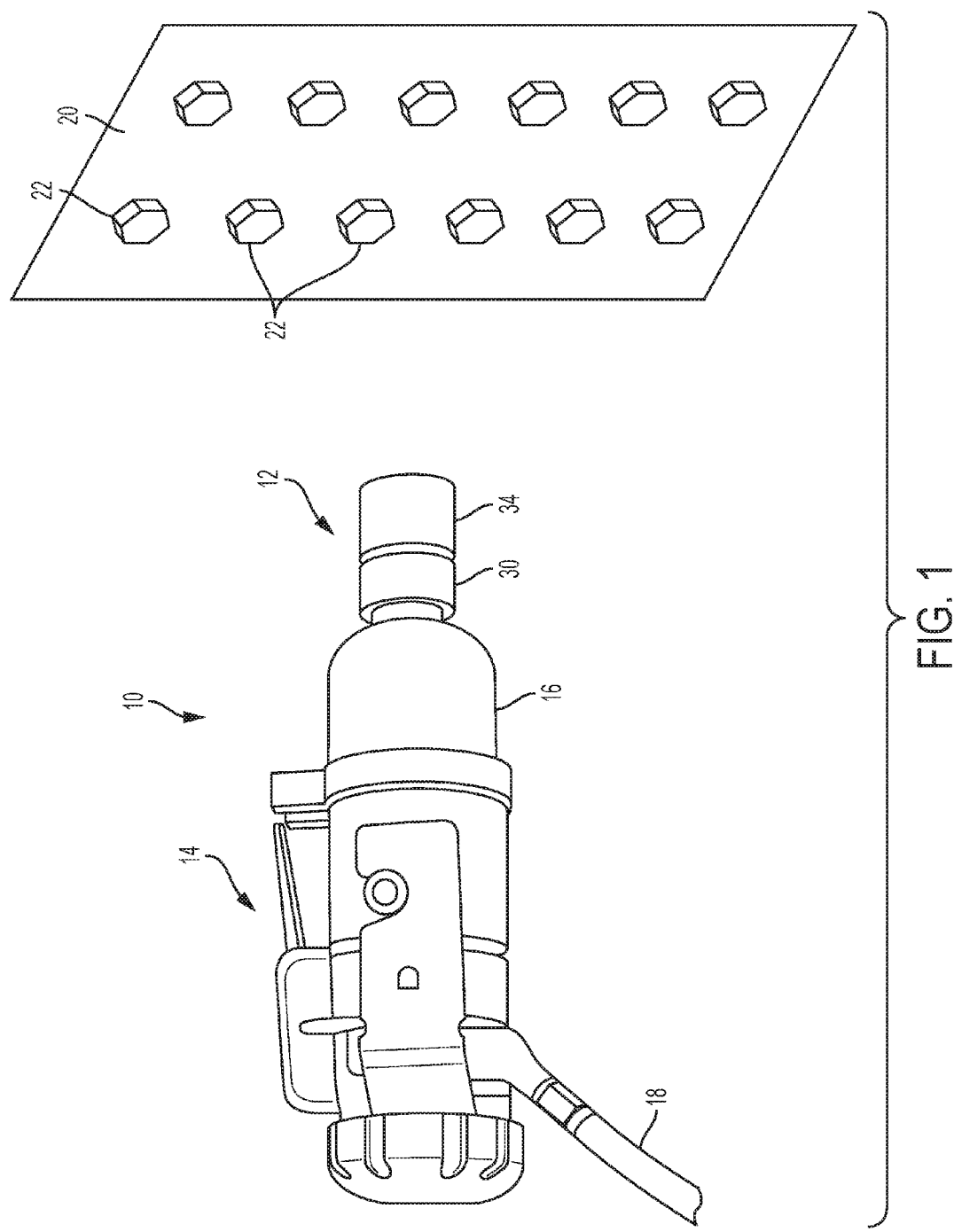
FIG. 1 depicts an illustrative system for applying liquid sealant in accordance with aspects of the present disclosure with an illustrative panel of fasteners.

An illustrative embodiment of the disclosed sealant application system 10 is shown in FIG. 1, and includes an applicator 12 that is configured to apply liquid sealant to a fastener, and a pressurizable source of liquid sealant 14.

The present applicator and liquid sealant application system may be useful for the application of a liquid sealant to fasteners of all types. In particular, the present applicator may be used to apply liquid sealant to that portion of a fastener that may be exposed to one or more environmental hazards, such as moisture, dust particles, corrosive agents, and the like. Typically, a liquid sealant is applied to the head of a fastener, or that portion of a fastener that protrudes from a surface of a component that has been attached or joined to an assembly, at least in part, by the fastener. In some aspects of the disclosure, the fastener may be for example a nail, a bolt, a pin, or a screw, among other conventional fasteners, and the head of the fastener may correspond to an enlarged shape on one end of the fastener intended to help retain the joined component in place and/or to provide a shape or configuration that facilitates installation or removal of the fastener.

Alternatively or in addition a fastener may include a hardware assembly having multiple individual pieces of hardware, such as for example an anchor used to retain a bolt in place, a nut, a collar, or a spacer to occupy a defined space for the fastener installation, such as a washer, a bearing, or a bushing. For the purposes of the application of sealant, such assemblies may also be referred to as a fastener, and the application of sealant to the fastener head includes the application of sealant to the exposed components of the fastener assembly, as well as the exposed joints between the individual components of the fastener.

Examples of suitable fastener heads may include, but are not limited to, bolt heads (comprising at least the following: pan head, flat head, round head, oval head, fillister head, binding head, truss head, holt head, one-way head, Phillips finishing washer head, washer head, undercut head, square shoulder screws, indented hexagon, hexagon washer head, acorn head, hexagon head, welding screw, flat head welding screw, T-welding screw), screw heads (comprising at least the following: countersunk head, round head, raised head, square coach, hexagonal coach), and nuts (comprising at least the following: hex nut, hex cap nuts low crown, K-lock nuts, nylon insert nuts and wing nuts).

In some aspects of the disclosure, liquid sealant may be applied to less than the entire exposed surface of the fastener head. In another aspect of the disclosure it may be desirable to apply liquid sealant substantially uniformly to the entire exposed surface of the fastener head and to the joint between the fastener head and the component surface that it may protrude from. For this reason, a satisfactory application of liquid sealant may include application of sealant to the entire exposed surface of the fastener head as well as a circumferential portion of the surrounding exposed component surface.

The sealant may be any suitable liquid composition that is curable and that will provide a desired protective coating for the external portion of a fastener. A variety of sealants and primers are commercially available, including those formulated specifically for use in the aerospace industry. In a particular aspect of the disclosure, the sealant may incorporate a polysulfide, polythioether, and/or polyurethane formulation, and may optionally further include one or more corrosion inhibitors, such as for example dichromate. The sealant may require preparation before it can be applied, such as for example by mixing two or more components to form the curable sealant formulation.

Liquid sealant may be delivered to the applicator 12 from a conventional sealant cartridge mounted in a conventional pneumatic sealant gun 16, such as may be commercially available under the trade name SEMCO. Alternatively, the pressurized liquid sealant may be delivered to the applicator 12 via a disposable flexible conduit or tube by means of a peristaltic pump.

The liquid sealant may be forced from the applicator using a compressed gas. For example, regulated air pressure may be tapped from an air distribution system, a gas cylinder with regulator, or any other suitable compressed gas source and fed to the sealant gun 16 via an air hose 18.

Figure 2:
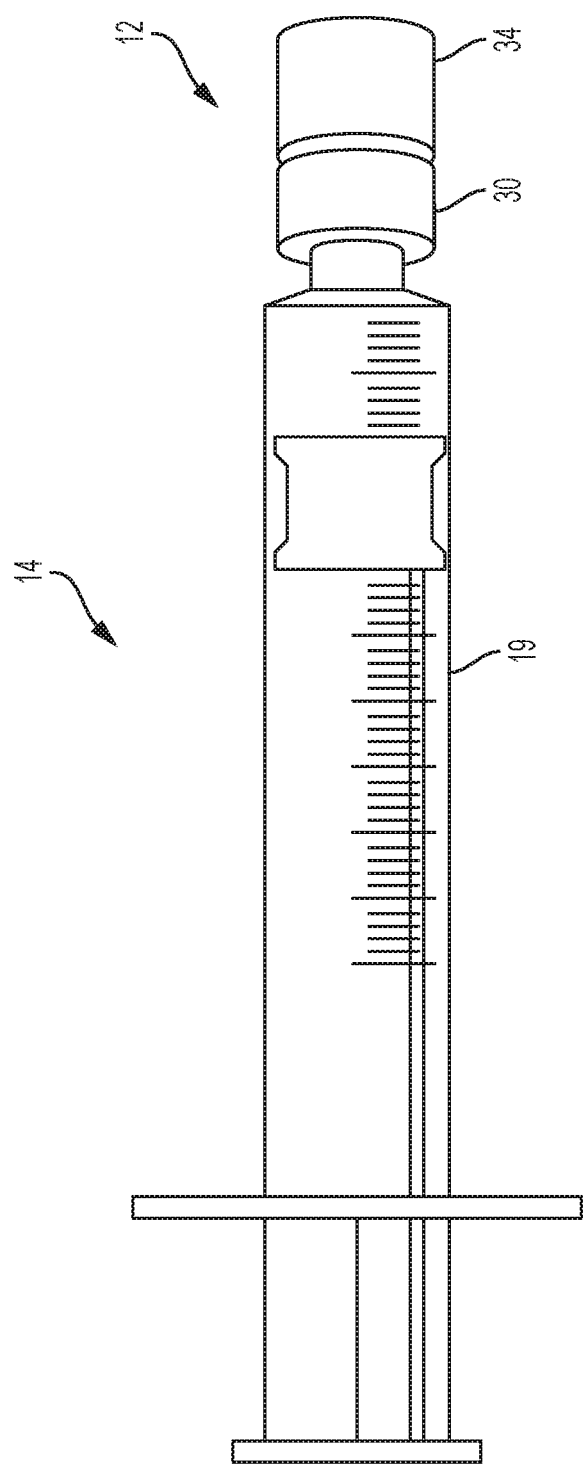
FIG. 2 depicts an alternative illustrative system for applying liquid sealant in accordance with aspects of the present disclosure.

Alternatively, the source of liquid sealant 14 may include a syringe 19 that is manually pressurized by, for example, compression of a plunger or other actuator to initiate or continue a flow of sealant, as depicted in FIG. 2. Where the source of liquid sealant 14 includes a syringe 19, where an appropriate syringe may include a plunger assembly disposed within a syringe barrel, where the syringe barrel includes a syringe fitting and the liquid sealant applicator 12 includes a coupling 30 that is compatible with the syringe fitting.

Also shown in FIG. 1 is a representative component surface 20 with a plurality of fastener heads 22 projecting therefrom. Although each fastener head 22 of FIG. 1 includes a hexagonal fastener head, the liquid sealant applicator of the present disclosure may be used in conjunction with any of a variety of fastener types and fastener assemblies.

The liquid sealant applicator 12 may be configured to be substantially compatible with a commercial pneumatic sealant gun 16, as depicted in FIG. 1, and may therefore replace an application nozzle or tip that may be more typically utilized with a pneumatic sealant gun 16.

Figure 3:
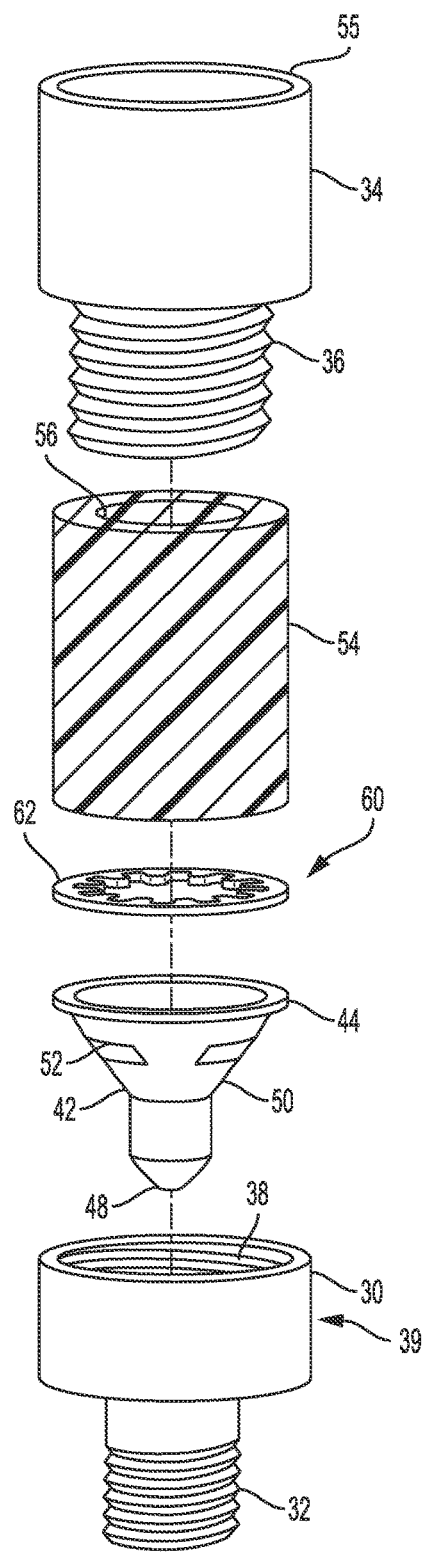
FIG. 3 is an exploded view depicting a liquid sealant applicator in accordance with aspects of the present disclosure.
Figure 4:
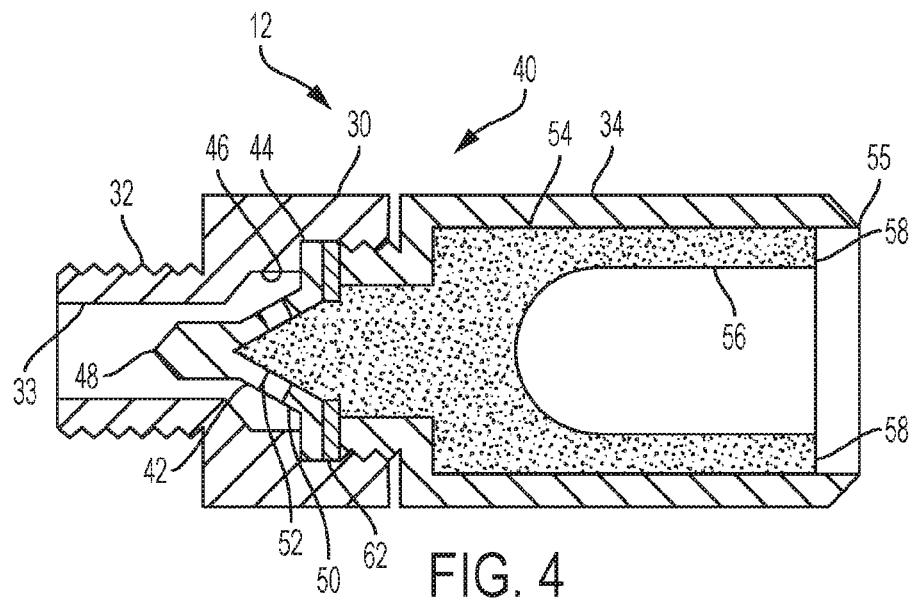
FIG. 4 is a cross-sectional view of the liquid sealant applicator of FIG. 3.

The liquid sealant applicator 12 is shown in greater detail in FIGS. 3 and 4. As shown, the liquid sealant applicator 12 may include a proximal coupling 30 that is configured to be compatible with the selected source of liquid sealant, so that the liquid sealant applicator 12 may be reversibly connected to the source of liquid sealant 14. The proximal coupling may be configured to connect to the source of liquid sealant via any appropriate type of reversible connector mechanism, such as a threaded connector, a quick-connect connector, or a bayonet-type connector. For example, the coupling 30 may include threading 32 that is configured to be compatible and complementary to the threading present on pneumatic sealant gun 14, so the liquid sealant applicator 12 may be readily installed and removed when desired.

Proximal coupling 30 may further include a central passage 33 for receiving the sealant entering the liquid sealant applicator from the source of liquid sealant. The size of the central passage 33 may be tuned to either increase or decrease the flow of sealant in order to achieve the desired sealant coverage of the fastener head.

The liquid sealant applicator 12 additionally includes a distal fastener socket 34 that is configured to be placed over a preselected fastener head so that it at least substantially encloses the fastener head. The fastener socket 34 additionally includes a mechanism for securely attaching the fastener socket 34 to coupling 30. For example, the fastener socket 34 may include threading 36 that is compatible with and complementary to threading 38 present on a sidewall 39 of the coupling 30, so that the fastener socket 34 may be securely and reversibly attached to the coupling 30. When fastener socket 34 is attached to coupling 30, the components combine to form a sidewall 40 that extends from the connector 30 to the fastener socket 34, where the sidewall 40 defines a flow path for sealant received from the source of liquid sealant 14 to the fastener socket 34.

The liquid sealant applicator 12, and more particularly the connector 30 and the fastener socket 34 may define an interior that includes one or more elongated cylindrical cavities. It is to be understood that the particular geometric configuration of the liquid sealant applicator 12 may possess any of a variety of geometries and is not limited to being cylindrical. Nevertheless, the liquid sealant applicator 12 typically possesses a cylindrical shape and/or symmetry.

Figure 5:
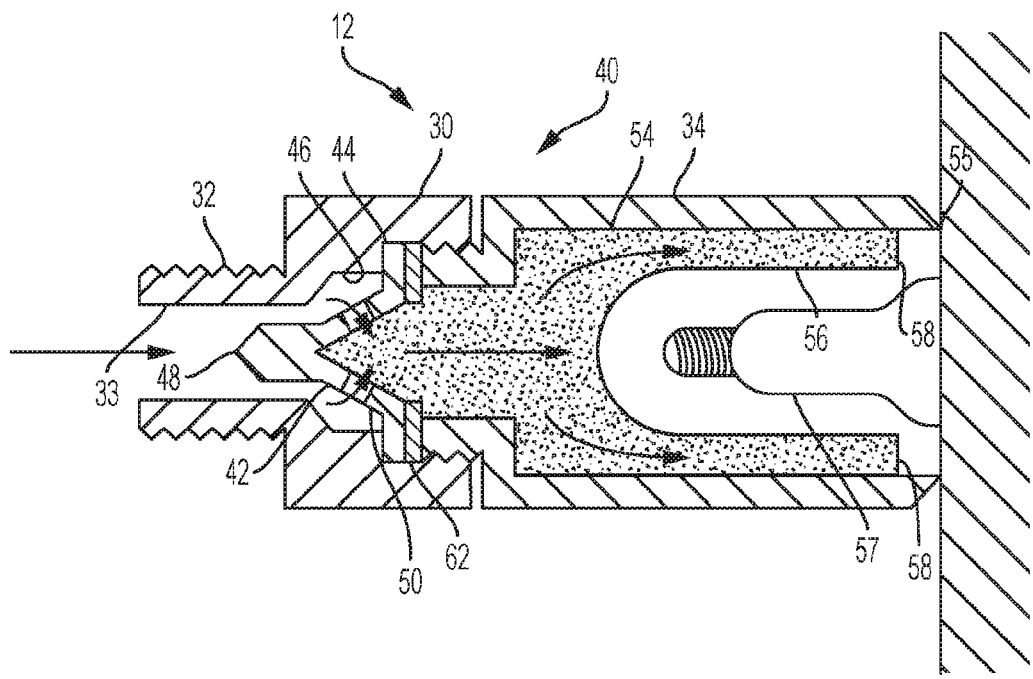
FIG. 5 is a cross-sectional view of the liquid sealant applicator of FIG. 3 schematically depicting movement of liquid sealant through the liquid sealant applicator.

Disposed in the sealant flow path between the coupling 30 and fastener socket 34 is a flow restrictor 42. The flow restrictor 42 is configured to both slow and spread the flow of sealant as it moves along the sealant flow path. The flow restrictor 42 may be secured and retained in place by any suitable means. As shown in FIGS. 3-5, flow restrictor 42 may include a peripheral lip 44 that rests upon a shoulder 46 formed on an inner surface of the coupling 30. In this manner, when coupling 30 and fastener socket 34 are joined, the flow restrictor is retained therebetween.

The flow restrictor 42 may have a generally conical shape, and may include a projecting central point 48. The flow restrictor 42 may be retained within the sealant flow path with the central point 48 oriented toward the source of liquid sealant. The conical sidewalls 50 of flow restrictor 42 may define a plurality of apertures 52 in the sidewalls 50 through which sealant may flow. The individual apertures 52 may have any suitable shape, but may be arranged in an annular pattern concentric with the cone of the flow restrictor 42. That is, the plurality of apertures 52, considered in combination, may define an annular shape centered within the sealant flow path. Each of the plurality of apertures may have an arcuate shape that corresponds to a section of an annular ring, as shown in FIG. 3.

Abutting the flow restrictor 42, and disposed downstream in the sealant flow path, is a porous matrix 54. The porous matrix substantially fills at least a portion of the sealant flow path downstream of the flow restrictor 42, and serves to diffuse and spread the sealant within the fastener socket 34 so that a uniform coat of sealant may be applied to a fastener head disposed within the fastener socket 34. The porous matrix 54 may be any material that is physically and chemically compatible with the sealant being applied by the liquid sealant applicator 12, provided it has an appropriate shape and porosity to create a uniform application of sealant without forming voids or bubbles.

In one aspect of the disclosure, the porous matrix 54 may be a foam or sponge, and in particular the porous matrix 54 may be a polyurethane open cell foam. Where the porous matrix 54 is a polyurethane open cell foam, it may be a substantially coarse foam having about 10 pores/inch, or the polyurethane open cell foam may be a finer foam having about 20, 30, 40, 45, 50, 60, 70, 80, or 100 pores/inch. In a selected embodiment, the porous matrix is a reticulated polyurethane open cell foam having about 60 pores/inch. An optimum porosity for the porous matrix 54 may be a function of the desired circumference of the fastener head to which sealant is being applied, as well as the viscosity of the sealant being applied, and can be readily determined by experimental optimization. Foam formulations suitable for use as a porous matrix may be obtained commercially from, for example, MERRYWEATHER FOAM INC. (Barberton, Ohio).

The porous matrix 54 typically abuts the flow restrictor 42, and may extend to the distal lip 55 of the fastener socket 34, provided that a central cavity 56 is formed in the porous matrix 54. Central cavity 56 may be centered within the fastener socket 34, and may be sized and possess a geometry appropriate for the type of fastener head to which sealant is to be applied. That is, a relatively flat fastener head, such as a hexagonal head of a bolt, may require a central cavity 56 that is relatively shallow but broad, while a tall fastener, such as for example fastener 57 of FIG. 5, may require a deeper central cavity 56.

The central cavity 56 defined by the porous matrix 54 may be cylindrical in shape, or a rounded cylinder as shown in FIGS. 3 and 4. Alternatively, the central cavity 56 may be defined by the porous matrix 54 so as to have a hexagonal shape (when considered in cross-section) and thereby have particular utility for applying sealant to hexagonal-headed fasteners. The portions of the porous matrix 54 forming the walls 58 of the central cavity 56 may extend to the distal lip 55 of the fastener socket 34, or as shown in FIGS. 3 and 4, the walls 58 of the central cavity 56 may terminate before reaching distal lip 55. The specific size and shape of central cavity 56 may be determined by experimental optimization and the size and shape of the fastener head to which sealant is to be applied.

In order to help retain the porous matrix 54 in an appropriate position within the liquid sealant applicator 12, the porous matrix 54 may be fixed in place by a matrix retainer 60. The matrix retainer 60 may be any device that acts to maintain the position of the porous matrix 54, and specifically to prevent the pressure of the sealant flowing through porous matrix 54 from forcing the porous matrix 54 downstream, thereby creating a gap or space between the flow restrictor 42 and the porous matrix 54.

In a selected embodiment of the disclosure, the matrix retainer 60 includes a locking washer 62 that may be sized to be retained adjacent the flow restrictor 42 between the coupling 30 and the fastener socket 34, as shown in FIG. 4. The inner periphery of locking washer 62 may define a plurality of teeth that interact with the porous matrix 54 and hold the porous matrix 54 in place within the liquid sealant applicator 12. That is, locking washer 62 may retain the porous matrix 54 in abutment with flow restrictor 42 so that no voids or gaps are created in the sealant flow path.

In FIG. 4 the movement of liquid sealant through the liquid sealant applicator is shown using arrows. Sealant enters the applicator 12 via the central passage 33 of coupling 30. Under applied pressure generated by the source of liquid sealant 14, the liquid sealant encounters the flow restrictor 42 and is forced through the annular apertures 52 defined by the conical walls 50 of the flow restrictor 42. As the porous matrix 54 is retained in contact with the flow restrictor 42, the liquid sealant then perfuses evenly through the porous matrix 54, and is finally applied to the fastener head 57 in an even and continuous fashion.

The components of the disclosed liquid sealant applicators may be manufactured using a variety of materials and techniques. For example, the coupling 30, fastener socket 34, and flow restrictor 42 may be prepared using additive manufacturing techniques, or 3D printing, such as for example stereolithography processes. In this way a variety of liquid sealant applicators may be prepared sized and shaped to accommodate fastener heads of varying geometries. In addition, by using low cost materials, the liquid sealant applicators of the disclosure may be used and simply discarded, creating an additional time savings. Alternatively, the coupling 30 and fastener socket 34 of the liquid sealant applicator may be machined in a more conventional fashion from for example stainless steel or other metal or metal alloy, or even prepared by injection molding, provided that the polymers used possess sufficient strength and durability.

It should be appreciated that the liquid sealant applicator 12 may be quickly removed and replaced in order to apply sealant to a different configuration of fastener head. Replacing the liquid sealant applicator 12 may include removing the entire applicator from the source of liquid sealant, or where a plurality of fastener sockets 34 in various configurations are available and may be compatible with coupling 30, the fastener socket 34 may be quickly uncoupled (for example unscrewed) and replaced with an alternative fastener socket.

Figure 6:
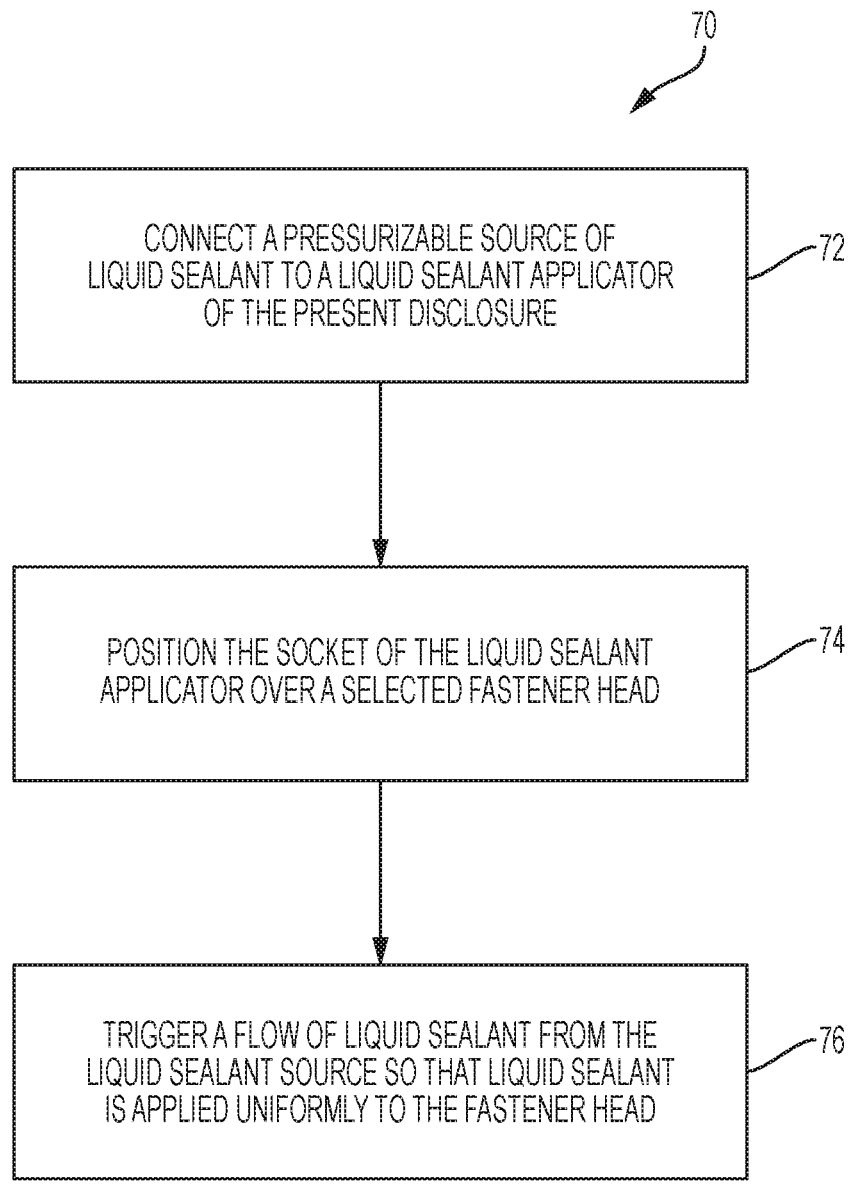
FIG. 6 is a flow chart depicting steps of a method for applying liquid sealant to a fastener, in accordance with aspects of the present disclosure

The liquid sealant applicators of the present disclosure lend themselves to a method of applying a liquid sealant to a fastener head, as shown in flowchart 70 of FIG. 6. The method may include connecting a pressurizable source of liquid sealant to a liquid sealant applicator according to the present disclosure, at 72 of flowchart 70; positioning the fastener socket of the liquid sealant applicator over a selected fastener head, at 74 of flowchart 70; and triggering a flow of sealant from liquid sealant source so that sealant is applied uniformly to the fastener head, at 76 of flowchart 70.

Triggering the flow of sealant may further include triggering the flow of sealant for a time sufficient for the liquid sealant applicator 12 to apply the desired amount of liquid sealant to the fastener head. However, the liquid sealant applicator 12 makes sealant application significantly faster than previous manual application methods, so that applying the sealant to the fastener head may require less than about 10 seconds. Furthermore, the presently disclosed liquid sealant applicator 12 may render the application of liquid sealant to fastener heads that protrude from a vertically oriented surface straightforward and efficient.

As discussed above, the modular nature of the liquid sealant applicator 12 permits the user to rapidly apply sealant to dissimilar fastener heads, by removing the fastener socket 34 of the applicator 12 from an already-sealed fastener head; disconnecting the fastener socket from the applicator; connecting a second and different fastener socket to the applicator, where the second fastener socket is configured to be placed over a different fastener head; positioning the second fastener socket over the second fastener head; and triggering a flow of sealant from the source of liquid sealant so that sealant is applied uniformly to the second fastener head.

Alternatively, or in addition, where the liquid sealant applicator 12 is manufactured so as to be disposable, applying sealant to fastener heads may further include disconnecting the liquid sealant applicator from the pressurizable source of liquid sealant; and discarding the liquid sealant applicator.

Additional Selected Embodiments

This section describes additional aspects and features of liquid sealant applicators of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. An applicator for applying a liquid sealant to a fastener, comprising:

a coupling that is configured to reversibly connect to a source of liquid sealant;

a sidewall extending from the coupling, the sidewall defining a liquid sealant flow path;

a flow restrictor disposed in the liquid sealant flow path, the flow restrictor restricting the sealant flow path to a plurality of apertures disposed in an annular pattern in the flow restrictor;

a porous matrix that substantially fills at least a portion of the liquid sealant flow path downstream of the flow restrictor;

a matrix retainer configured to retain the porous matrix within the liquid sealant flow path; and a fastener socket connected to the sidewall extending from the coupling, the fastener socket having a distal end configured to be placed over a head of a preselected fastener and to at least substantially enclose the fastener head;

wherein the applicator is configured to provide a uniform application of the liquid sealant from the source of the liquid sealant to the head of the fastener enclosed by the fastener socket.

A2. The applicator of paragraph A1, wherein the coupling is configured to connect to the source of liquid sealant via a threaded connector, a quick-connect connector, or a bayonet-type connector.

A3. The applicator of paragraph A1, wherein the porous matrix abuts the flow restrictor in the liquid sealant flow path.

A4. The applicator of paragraph A1, wherein the flow restrictor is substantially circular, and the annular pattern of apertures is substantially concentric with the flow restrictor A5. The applicator of paragraph A1, wherein the sidewall extending from the coupling includes a threaded portion, and the fastener socket includes a threaded portion; the sidewall and fastener socket being secured to each other by a threaded connection such that the flow restrictor and matrix retainer are secured between the sidewall and fastener socket by the threaded connection.

A6. The applicator of paragraph A5, wherein the matrix retainer is a locking washer that includes a plurality of inwardly-directed teeth, and the porous matrix is secured within the locking washer by the inwardly-directed teeth.

A7. The applicator of paragraph A1, wherein the porous matrix includes a polyurethane open cell foam.

A8. The applicator of paragraph A1, wherein the porous matrix extends to a lip of the fastener socket, excepting for a cavity defined by the porous matrix, the cavity being centered in the fastener socket and configured to accept the fastener head.

A9. The applicator of paragraph A1, wherein the source of liquid sealant is a standard sealant cartridge disposed in a pneumatic sealant gun.

A10. The applicator of paragraph A1, wherein the source of liquid sealant is a syringe.

A11. The applicator of paragraph A1, wherein the flow restrictor and porous matrix are configured so that when the source of liquid sealant is pressurized to between 90-100 psi, a liquid sealant flow rate is established that infuses liquid sealant substantially uniformly throughout the porous matrix.

B1. A liquid sealant application system, comprising:
a pressurizable source of liquid sealant; and
a liquid sealant applicator; wherein the liquid sealant applicator includes
a proximal coupling that is configured to reversibly connect to the pressurizable source of liquid sealant;
a sidewall extending from the proximal coupling;
a distal fastener socket connected to the sidewall and configured to be placed over a head of a preselected fastener;
a sealant flow path from the proximal coupling to the distal fastener socket;
a flow restrictor disposed in the liquid sealant flow path, the flow restrictor having a plurality of apertures disposed in an annular pattern that is centered in the sealant flow path;
a porous matrix that substantially fills at least a segment of the sealant flow path downstream of the flow restrictor; and
a matrix retainer configured to retain the porous matrix within the sealant flow path;
wherein the liquid sealant application system is configured to provide a uniform application of the liquid sealant from the source of the liquid sealant to the head of the fastener enclosed by the distal fastener socket.

B2. The liquid sealant application system of paragraph B1, wherein the proximal connector and distal fastener socket are connected to each other by a threaded connection that permits the distal fastener socket to be disconnected; and the flow restrictor, porous matrix, matrix retainer, and distal fastener socket are configured to be interchangeable with an alternative flow restrictor, porous matrix, matrix retainer, and distal fastener socket configured for a different preselected fastener head.

B3. The liquid sealant application system of paragraph B1, wherein the pressurizable source of liquid sealant includes a syringe or a pneumatic sealant gun.

B4. The liquid sealant application system of paragraph B1, wherein the pressurizable source of liquid sealant is pressurized manually, pressurized using a portable source of compressed gas, or pressurized using a plumbed source of compressed gas.

C1. A method of applying a liquid sealant to a fastener, comprising: connecting a pressurizable source of liquid sealant to a liquid sealant applicator; wherein the liquid sealant applicator includes
a defined flow path for the liquid sealant;
a fastener socket at the end of the defined flow path configured to be placed over the fastener head;
a flow restrictor disposed in the defined flow path; and
a porous matrix occupying the defined flow path, the porous matrix contacting the flow restrictor and extending at least partially into the fastener socket;
positioning the fastener socket over the fastener head;
triggering a flow of liquid sealant from the source of liquid sealant, wherein by passing through the flow restrictor and porous matrix the liquid sealant is applied uniformly to the fastener head.

C2. The method of paragraph C1, wherein triggering the flow of liquid sealant includes triggering the flow of liquid sealant for a time sufficient for the applicator to apply a desired amount of liquid sealant to the fastener head.

C3. The method of paragraph C1, wherein at least the fastener socket is removable from the applicator, further comprising:
removing the fastener socket from being positioned over the fastener head;
disconnecting the fastener socket from the applicator;
connecting a second fastener socket to the applicator, wherein the second fastener socket is configured to be placed over a head of a different second fastener of a different size;
positioning the second fastener socket over the second fastener head;
triggering a flow of liquid sealant from the source of liquid sealant, wherein by passing through the flow restrictor and porous matrix the liquid sealant is applied uniformly to the second fastener head.

C4. The method of paragraph C1, further comprising:
disconnecting the liquid sealant applicator from the pressurizable source of liquid sealant; and
discarding the liquid sealant applicator.

C5. The method of paragraph C1, wherein applying the liquid sealant to the fastener head includes applying the liquid sealant to a vertically oriented surface.

C6. The method of paragraph C1, wherein applying the liquid sealant to the fastener head comprises triggering the flow of liquid sealant from the source of liquid sealant to the fastener head in a time period of less than about 10 seconds.

Advantages, Features, Benefits

The various embodiments of a liquid sealant applicator described herein may provide several advantages over known solutions for applying primers and sealants to fastener heads.

The disclosed liquid sealant application may be rendered compatible with existing commercially available sealant sources, such as SEMCO pneumatic sealant guns among others.

Additionally or in the alternative, the distal portion of the disclosed liquid sealant application, including the fastener socket and porous matrix, may be readily exchanged for a fastener socket and porous matrix suitable for a fastener head having a different size and/or geometry.

Additionally or in the alternative, the porous matrix of the liquid sealant applicator may be selected to have a pore size that is optimized for a particular liquid sealant, for example based upon the viscosity and/or the desired flow rate for that sealant.

Additionally or in the alternative, the construction of the liquid sealant applicator of the disclosure, including the flow restrictor, may prevent point loading onto the porous matrix, so that the liquid sealant may be evenly distributed, uniformly applied, and does not spill even when the distal portion of the applicator may be exchanged for an alternative dize and/or geometry.

Additionally or in the alternative, the liquid sealant applicator of the present disclosure may be incorporated into a sealant application system that may be field portable, for example by using a compressed gas cylinder, so that the liquid sealant applicator can operate independently of external environmental conditions. As a result the user may be able to work within limited access areas without being required to be connected to a plumbed compressed air line.

Additionally or in the alternative, the use of the liquid sealant applicator of the present disclosure may decrease sealant application time from about 1-2 minutes per fastener head to as little as 5 to 7 seconds per fastener head. It will also reduce chemical exposure to the mechanics.

Additionally or in the alternative, the liquid sealant applicator of the present disclosure facilitates a more consistent and standardized application of sealant or primer to fastener heads, thereby improving the quality of the applied coating.

CONCLUSION

While the liquid sealant applicators and methods of applying liquid sealant to fastener heads have been particularly shown and described with reference to preferred embodiments thereof, it will be understood by those skilled in the art that various other changes in the form and details may be made therein without departing from the spirit and scope of the invention. The foregoing description of the exemplary embodiments of the invention has been presented for purposes of illustration and description. It is not intended to be exhaustive or to limit the invention to the precise form disclosed. Man modifications and variations are possible in light of the above teaching. It is intended that the scope of the invention be limited not with this detailed description but rather by the claims appended hereto.

The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. An applicator for applying a liquid sealant to a fastener, comprising:
   a coupling that is configured to reversibly connect to a source of liquid sealant;
   a sidewall extending from the coupling, the sidewall including a threaded portion and defining a sealant flow path;
   a flow restrictor disposed in the sealant flow path, the flow restrictor restricting the sealant flow path to a plurality of apertures disposed in an annular pattern in the flow restrictor;
   a porous matrix that fills at least a portion of the sealant flow path downstream of the flow restrictor;
   a matrix retainer configured to retain the porous matrix within the sealant flow path, where the matrix retainer is a locking washer that includes a plurality of inwardly-directed teeth, and the porous matrix is secured within the locking washer by the inwardly-directed teeth; and
   a fastener socket connected to the sidewall extending from the coupling, the fastener socket including a threaded portion and having a distal end configured to be placed over a head of a preselected fastener and to enclose the fastener head;
   wherein the sidewall and fastener socket are secured to each other by a threaded connection between the threaded portions, such that the flow restrictor and matrix retainer are secured between the sidewall and fastener socket by the threaded connection; and
   the applicator is configured to provide a uniform application of the sealant from the source of the liquid sealant to the head of the fastener enclosed by the fastener socket.

2. The applicator of claim 1, wherein the coupling is configured to connect to the source of liquid sealant via a threaded connector, a quick-connect connector, or a bayonet-type connector.

3. The applicator of claim 1, wherein the porous matrix abuts the flow restrictor in the sealant flow path.

4. The applicator of claim 1, wherein the flow restrictor is circular, and the annular pattern of the plurality of apertures is concentric with the flow restrictor.

5. The applicator of claim 1, wherein the porous matrix includes a polyurethane open cell foam.

6. The applicator of claim 1, wherein the porous matrix extends to a lip of the fastener socket, excepting for a cavity defined by the porous matrix, the cavity being centered in the fastener socket and configured to accept the fastener head.

7. The applicator of claim 1, wherein the source of liquid sealant is a standard sealant cartridge disposed in a pneumatic sealant gun.

8. The applicator of claim 1, wherein the source of liquid sealant is a syringe.

9. The applicator of claim 1, wherein the flow restrictor and porous matrix are configured so that when the source of liquid sealant is pressurized to between 90-100 psi, a sealant flow rate is established that infuses sealant uniformly throughout the porous matrix.

10. A liquid sealant application system, comprising:
    a pressurizable source of liquid sealant; and
    a liquid sealant applicator; wherein the liquid sealant applicator includes
       a proximal coupling that is configured to reversibly connect to the pressurizable source of liquid sealant;
       a sidewall extending from the proximal coupling;
       a distal fastener socket connected to the sidewall and configured to be placed over a head of a preselected fastener;
       a sealant flow path from the proximal coupling to the distal fastener socket;
       a flow restrictor disposed in the sealant flow path, the flow restrictor having a plurality of apertures disposed in an annular pattern that is centered in the sealant flow path;
       a porous matrix that fills at least a segment of the sealant flow path downstream of the flow restrictor; and
       a matrix retainer configured to retain the porous matrix within the sealant flow path, where the matrix retainer is a locking washer that includes a plurality of inwardly-directed teeth, and the porous matrix is secured within the locking washer by the inwardly-directed teeth; wherein
       the proximal coupling and distal fastener socket are connected to each other by a threaded connection that permits the distal fastener socket to be disconnected;
       the flow restrictor and matrix retainer are secured between the proximal coupling and the distal fastener socket by the threaded connection; and
    the liquid sealant application system is configured to provide a uniform application of the sealant from the source of the liquid sealant to the head of the fastener enclosed by the distal fastener socket.

11. The liquid sealant application system of claim 10, wherein the flow restrictor, porous matrix, matrix retainer, and distal fastener socket are configured to be interchangeable with an alternative flow restrictor, porous matrix, matrix retainer, and distal fastener socket configured for a different preselected fastener head.

12. The liquid sealant application system of claim 10, wherein the pressurizable source of liquid sealant includes a syringe or a pneumatic sealant gun.

13. The liquid sealant application system of claim 10, wherein the pressurizable source of liquid sealant is pressurized manually, pressurized using a portable source of compressed gas, or pressurized using a plumbed source of compressed gas.

\* \* \* \* \*